United States Patent [19]

Yamaguchi et al.

[11] Patent Number: 5,385,991
[45] Date of Patent: Jan. 31, 1995

[54] METHOD FOR PRODUCING POLYOLEFIN

[75] Inventors: Yoshihisa Yamaguchi; Shinjiro Suga, both of Kawasaki; Masatoshi Morikawa, Setagaya; Kunimichi Kubo, Meguro; Motokazu Watanabe, Kawasaki; Yasuhiko Sano, Katsushika, all of Japan

[73] Assignee: Nippon Petrochemicals Company, Limited, Tokyo, Japan

[21] Appl. No.: 844,590

[22] PCT Filed: Jul. 26, 1991

[86] PCT No.: PCT/JP91/01010

§ 371 Date: Mar. 27, 1992

§ 102(e) Date: Mar. 27, 1992

[87] PCT Pub. No.: WO92/02563

PCT Pub. Date: Feb. 20, 1992

[30] Foreign Application Priority Data

| Jul. 27, 1990 | [JP] | Japan | 2-200008 |
| Jul. 27, 1990 | [JP] | Japan | 2-200009 |
| Jul. 27, 1990 | [JP] | Japan | 2-200010 |
| Sep. 3, 1990 | [JP] | Japan | 2-232723 |

[51] Int. Cl.$^6$ .................. C08F 2/34; C08F 10/00
[52] U.S. Cl. .................. 526/74; 526/88; 526/901
[58] Field of Search .................. 526/88, 74, 901

[56] References Cited

U.S. PATENT DOCUMENTS

| 4,855,370 | 8/1989 | Chirillo et al. | 526/74 |
| 4,876,320 | 10/1989 | Fulks et al. | 526/88 |
| 5,034,479 | 7/1991 | Eisinger et al. | 526/68 |

Primary Examiner—Joseph L. Schofer
Assistant Examiner—David Wu
Attorney, Agent, or Firm—Yahwak & Associates

[57] ABSTRACT

A process for producing polyolefin with a vapor-phase fluidized-bed reactor, wherein the reaction is started after filling the reactor with particles which contain moisture and/or molecular oxygen and can form a fluidized bed in order to prevent the formation of molten resin which is liable to occur at the start of the reaction and to attain a smooth operation of the reactor.

10 Claims, No Drawings

METHOD FOR PRODUCING POLYOLEFIN

TECHNICAL FIELD

The present invention relates to a method for carrying out stable operation in the production of polyolefins. More particularly, the invention relates to a method to suppress the formation of molten resins which is liable to occur in the beginning stage of the reaction for the production of polyolefins using a vapor phase fluidized-bed reactor and to attain the smooth operation of the reactor.

BACKGROUND ART

In a polymerization process for preparing polyolefins using a vapor-phase fluidized-bed, the fluidized-bed reactor is previously fed with resin powder called seed polymer and it is then fluidized. The polymerization reaction is carried out by continuously feeding mixed gas materials, catalysts and alkylaluminum compounds as catalyst promoters. Simultaneously with the above operation, impurities (oxygen, moisture or the like) in the gas are removed. The polymer particles which grew up during a predetermined residence time are taken out. When the above-mentioned seed polymers are not used, the fed catalyst cannot be well dispersed to form granular resins; therefore, the fluidized-bed is not formed. Accordingly, in a fluidized-bed polymerization reactor, seed polymers have inevitably been used in the start of operation.

In the production of polyolefins using a vapor-phase fluidized-bed, it is most important that the fed catalysts be dispersed evenly in a reactor and the fluidized gas is also distributed uniformly in the reactor, thereby effectively removing the heat of reaction. That is, when the concentration of catalyst is extremely high locally in a reactor or the cooling effect is insufficient because of the lack of the dispersion of gases, molten resins are formed into lumps which hinder the fluidization, and the temperature distribution becomes more uneven resulting in the formation of much more molten resins. Owing to this vicious circle, the produced resin cannot be withdrawn from the vessel and the reaction must be stopped.

Concerning the above problems, the latter uniform distribution of fluidized gas can be solved rather easily by examining the relationship between particle size, its distribution, the bulk density of resins, and fluidizing gas velocity, with taking the structure of the vessel into consideration. However, regarding the former problem of the dispersion of catalyst, the uniform dispersion has been hardly realized, because the fine powder of catalyst clings to the wall of the vessel due to static electricity generated by the flow of catalyst and resin powder, thereby locally increasing the catalyst concentration. In many cases, this phenomenon is caused to occur markedly in about half a day after the beginning of reaction, and the temperature is raised only in the wall portion wherein the melting of resin is caused to occur.

It is often experienced that resin powder is statically charged when it is fluidized. For example, it is known that when resin powder is transferred through a pipe, it clings thinly to the inside surface of the pipe. In the production of polyolefins with a fluidized-bed, such a phenomenon was also experienced heretofore. As the countermeasures for this, U.S. Pat. No. 4,855,370 discloses that a reactor is fed with moisture-containing gas; Japanese Laid-Open Publication No. 56-4608 discloses a method to allow liquid hydrocarbons to coexist; furthermore, U.S. Pat. No. 4,532,311 discloses the addition of chromium compounds; and Japanese Laid-Open Publication No. 1-230607 discloses the addition of an alcohol or ketone into a reactor. In all of these methods, specific substances are supplied into a reactor during polymerization reaction; therefore, particular apparatus must be installed when practiced, and the operation is naturally complicated. Accordingly, a much simpler measure to eliminate effectively the above disadvantages is eagerly required.

The object of the present invention is to provide a method for producing polyolefin particles, which method is free from the above disadvantages in a polymerization reaction with a vapor-phase fluidized-bed and easily prevents the formation of molten resin due to the occurrence of static electricity without any additional installation to a reaction system.

DISCLOSURE OF INVENTION

After intensively investigating the above object, the inventors have found out that formation of molten resin can be avoided by filling a reactor with particles containing moisture and/or molecular oxygen before initiating a fluidized-bed reaction, thereby accomplishing the present invention.

The present invention provides a method for producing polyolefins using a reaction of polymerizing $\alpha$-olefins with a vapor-phase fluidized-bed, which is characterized in that particles are introduced into a reactor before the reaction is initiated, which particles contain moisture and/or molecular oxygen and which can form a fluidized-bed.

The present invention will be described in more detail in the following.

A vapor-phase fluidized-bed used in the present invention includes all the fluidized-bed systems operated substantially in gas-solid system, with or without stirrers.

Exemplified as $\alpha$-olefins used in the present invention are generally those having 2 to 8 carbon atoms such as ethylene, propylene, 1-butene, 1-hexene, 4-methyl-1-pentene, 1-octene. These are used separately or as a mixture of 2 or more compounds. Further, other gases than the above olefins can be mixed together if nothing interferes with the present invention.

As the examples of catalysts used in polymerization of $\alpha$-olefins by the above vapor-phase fluidized-bed, there are Ziegler catalysts which consist of a solid catalyst component containing at least magnesium, titanium and/or vanadium and an organoaluminum compound, Phillips catalysts containing chromium compounds, and other known catalysts. Exemplified as solid catalyst components of Ziegler catalyst are those containing magnesium chloride-titanium tetrachloride, and as their organoaluminum compound, triethylaluminum. The solid catalyst components may be activated with diethylaluminum chloride or the like.

The most preferable catalyst used in the present invention is a combination of an olefin polymerization catalyst component having at least titanium compound and/or vanadium compound carried on a silicon oxide and/or aluminum oxide, and an organometallic compound.

The above silicon oxide is a double oxide comprising silica or silicon and at least one other metal in groups I to VII of the periodic table. The above aluminum oxide is a double oxide comprising alumina or aluminum and at least another metal in groups I to VII of the periodic table.

Exemplified as the above double oxides comprising silicon or aluminum and at least one other metal in groups I to VII of the periodic table are typically natural or synthetic oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, and $SiO_2 \cdot MgO$. The above formulae are not intended to show their molecular structures but only their compositions. The structures and component ratios of double oxides used in the present invention are not especially limited.

Examples of the titanium compounds and/or vanadium compounds used in the present invention include a halide, alkoxyhalide, alkoxide and halogenated oxide of titanium and/or vanadium. As the titanium compounds, tetravalent and trivalent titanium compounds are preferred. Preferable examples of the tetravalent titanium compounds are represented by the general formula $Ti(OR)_nX_{4-n}$ wherein R is an alkyl group or aralkyl group having 1 to 20 carbon atoms, X is a halogen atom, and n is a value satisfying the relation of $0 \leq n \leq 4$. Preferable examples of these titanium compounds include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of the trivalent titanium compounds, there are trihalogenated titanium compounds that are prepared by reducing tetrahalogenated titanium such as titanium tetrachloride and titanium tetrabromide with hydrogen, aluminum, titanium or an organometallic compound of a metal in groups I to III of the periodic table. Furthermore, other usable exemplary compounds are the trivalent titanium compounds which are obtained by reducing, with an organometallic compound of a metal in groups I to III of the periodic table, a tetravalent halogenated alkoxytitanium represented by the general formula $Ti(OR)_mX_{4-m}$ wherein R is an alkyl group, aryl group or aralkyl group having 1 to 20 carbon atoms, X is a halogen atom, and m is a value satisfying the relation of $0 < m < 4$. As the vanadium compounds, there are tetravalent vanadium compounds such as vanadium tetrachloride, vanadium tetrabromide, vanadium tetraiodide and tetraethoxyvanadium; pentavalent vanadium compounds such as vanadium oxytrichloride, vanadyl ethoxydichloride, vanadyl triethoxide and vanadyl tributoxide; and trivalent vanadium compounds such as vanadium trichloride and vanadium triethoxide.

In order to increase the effect of the present invention, titanium compound and vanadium compound are often used together. In this case, the molar ratio of V/Ti is preferably 2/1 to 0.01/1.

As the components carried on the metallic oxides used in the present invention, the above transition metal compounds can be used alone, but they are preferably used together with magnesium compounds. Examples of magnesium compounds include metallic magnesium, magnesium hydroxide, magnesium carbonate, magnesium oxide, magnesium fluoride, magnesium chloride, magnesium bromide, magnesium iodide; a double salt, double oxide, carbonate, chloride or hydroxide containing magnesium atom and an element selected from silicon, aluminum and calcium; and further, a compound which is obtained by treating or reacting these inorganic solid compounds with an oxygen-containing compounds, sulfur-containing compound, aromatic hydrocarbon or halogen-containing material.

In addition to transition metal compounds and magnesium compounds, one or more compounds having the general formula $R_mMe(OR')_nX_{z-m-n}$ can be used together, wherein Me is an element in groups I to IV of the periodic table, z is a valence of the element Me, m is a value satisfying the relation of $0 \leq m \leq z$, n is a value satisfying the relation of $0 \leq n \leq z$, $0 \leq m+n \leq z$, X is a halogen atom; and R and R' are the same or different hydrocarbon groups such as alkyl group, aryl group and aralkyl group having 1 to 20 carbon atoms, preferably 1 to 8 carbon atoms. As the preferable examples, there are $Mg(OC_2H_5)_2$, $Mg(OC_2H_5)Cl$, $B(OC_2H_5)_3$, $Al(OCH_3)_3$, $Al(OC_2H_5)_3$, $Al(On-C_3H_7)_3$, $Al(O-i-C_3H_7)_3$, $Al(On-C_4H_9)_3$, $Al(O-sec-C_4H_9)_3$, $Al(O-tert-C_4H_9)_3$, $Al(OC_6H_5)_3$, $Al(OC_8H_{17})_3$, $Al(OCH_3)_2Cl$, $Al(OC_2H_5)_2Cl$, $Al(OC_2H_5)Cl_2$, $Al(O-i-C_3H_7)_2Cl$, $Al(O-i-C_3H_7)Cl_2$, $Si(OC_2H_5)_4$, $Si(OC_2H_5)_3Cl$, $Si(OC_2H_5)_2Cl_2$, $Si(OC_2H_5)Cl_3$, $SiCl_4$, $CH_3SiCl_3$, $(CH_3)_2SiCl_2$, $C_2H_5SiCl_3$, $n-C_4H_9SiCl_3$, $C_8H_{17}SiCl_3$, $C_{18}H_{37}SiCl_3$, $C_6H_5SiCl_3$, $(C_6H_5)_2SiCl_2$.

Although methods for contacting these compounds with each other are not restricted, it is recommended that the compounds are heated and mixed in an organic solvent such as inactive hydrocarbon, alcohol, ether, ketone or ester at the temperature of 50° to 200° C. for 5 minutes to 24 hours, and then the solvent is removed.

Examples of the organometallic compounds used in the present invention include those of organometallic compounds of metals in groups I to IV of the periodic table which are known as components of Ziegler catalyst, and particularly organoaluminum compounds and organozinc compounds are preferable. As the examples, there are organoaluminum compounds represented by the general formulae: $R_3Al$, $R_2AlX$, $RAlX_2$, $R_2AlOR$, $RAl(OR)X$ and $R_3Al_2X_3$ wherein R is the same or different alkyl group or aryl group having 1 to 20 carbon atoms and X is a halogen atom; and organozinc compounds represented by the general formula $R_2Zn$ wherein R is the same or different alkyl group having 1 to 20 carbon atoms. Examples include triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, diethylaluminum ethoxide, ethylaluminum sesquichloride, diethylzinc and their mixtures. Although the quantity used of the organometallic compound is not particularly limited, it is usually in the range of 0.1 to 1,000 mol times as much as the quantity of the titanium compound and/or vanadium compound.

It has been generally considered that water and oxygen are harmful impurities which suppress the reductive function of the catalyst so that they must be removed with a promoter such as alkylaluminum before the reaction is initiated. However, as disclosed herein, when particles containing moisture and/or molecular oxygen are put into a reactor before the reaction is initiated, the formation of massive molten resins due to static electricity after the beginning of the reaction can be suppressed markedly without substantially lowering the reaction rate of polymerization. This fact was never experienced in the use of the conventional seed polymers.

As the above particles containing moisture and/or molecular oxygen which are previously introduced into the reactor, any kind of particles can be used so long as they can form a fluidized-bed. However, in view of the fluidized conditions and the effect on the quality of product, it is preferable that the resin particles, particularly particles consisting of the same components as those of the product polyolefins or the like are used with moisture and/or molecular oxygen added. Therefore, preferable particles are those which are obtained by adding moisture and/or molecular oxygen to polyolefin particles produced with the above exemplified Ziegler catalysts or Phillips catalysts, whichever the production method may be, for example, vapor-phase, liquid phase or slurry.

When polyolefin particles are used with moisture added, the particles containing a large quantity of residual catalyst are preferable. When the quantity of residual catalyst is large, the effect of preventing the formation of molten resins is better and also the effect of hindering the reaction is less than when the quantity of residual catalyst is smaller.

Further, as regards the properties of polyolefin particles used for the above object, it is preferable that the particles have average particle size of 500 to 2,000 $\mu$m, little fine powders and bulk density of 0.25 to 0.5 g/cm$^3$.

When the particles containing moisture are used, the quantity of moisture is 20 to 80 ppm, preferably 30 to 50 ppm of particle weight. When the moisture content is less than 20 ppm, the effect of suppressing the formation of molten resins can not be obtained. On the other hand, when the moisture content is more than 80 ppm, polymerization reaction is interrupted, or water and alkylaluminum react abruptly-to promote the formation of molten resins on the contrary. So, neither case is preferred.

When the particles containing molecular oxygen are used, the quantity of oxygen is not always strictly limited. The object can be attained easily by bringing the particles into full contact with molecular oxygen at room temperature. When said particles are polyolefin, 0.02 to 0.2 kg of oxygen is preferably brought into contact with 1 kg of polyolefin by flowing for 1 hour or more.

Further, when the particles containing moisture and molecular oxygen are used, the quantity of each is preferably the same as the above.

The moisture and/or molecular oxygen contained in the particles are preferably distributed uniformly over the whole particles. For this purpose, when the moisture and/or molecular oxygen are added, an inert gas containing water vapor and/or molecular oxygen is introduced into the storage container of said particles, or a mixer with stirrer or a screw mixer is used to treat the particles with an inert gas containing water vapor and/or molecular oxygen. Both these methods may be used jointly.

As the gas containing molecular oxygen, air is most preferable practically. When air is used, trace components such as argon, carbon dioxide, water vapor, further nitrogen oxide, chlorides and hydrocarbons, as well as main components of nitrogen and oxygen are considered to act collectively. Methods for bringing particles into contact with air are not limited; for example, it is sufficient to leave the particles still in the atmosphere. Exposure to the atmosphere for more than about 5 hours at room temperature suffices. However, a uniform contact is necessary for increasing the contacting effect, and so it is preferable to bring the particles into contact with a flow of air. As the preferable examples, there are a method to introduce dry air or air containing moisture into a storage container of particles, and a method to flow the above air through the particles in a mixer with stirrer or screw mixer with the particles being stirred forcedly.

As a method to fill a reactor with particles containing moisture and/or oxygen, feeding with a gas is generally employed, and the filling quantity is to be a sufficient level to keep the necessary height of a fluidized-bed for polymerization reaction. Therefore, the filling quantity is determined according to a volume of reactor, fluidized-bed height and the like. The particles mixed with known seed polymers can also be used naturally so long as the effect of the present invention is attained. In this case, the filling quantity of the particles containing moisture and/or oxygen of the present invention is naturally less than the whole quantity of particles sufficient to keep a fluidized-bed height necessary for polymerization reaction.

BEST MODE FOR CARRYING OUT THE INVENTION

The present invention will be described in more detail with reference to examples and comparative examples. However, the invention is not restricted to these examples.

<EXAMPLE 1>

For producing a linear low density ethylene-1-butene copolymer with vapor-phase fluidized-bed reaction, a feed gas consisting of 40 mol% of ethylene, 8 mol% of hydrogen, 17 mol% of 1-butene and 35 mol% of nitrogen was recycled with heating in the reaction system. The system was dried until the moisture content therein was lowered to less than 1 ppm. Then, nitrogen was fed with a velocity (based on empty column) of 0.75 cm/sec into the bottom of the storage silo which contained the resin particles of ethylene-1-butene copolymer (average particle size 1,000 $\mu$m) that had been produced previously; water was vaporized through a heater with a constant volume pump and introduced into the above nitrogen flow. The above treating was continued for 24 hours, while the quantity of introduced water reached $3 \times 10^{-3}$ kg-water/kg-seed polymer. As a result, the moisture content of the seed polymer before it is fed to the reactor was 35 ppm.

The moistened seed polymer was introduced into the reactor by the flow of nitrogen and it was fluidized with the same feed gas to initiate the reaction. The catalyst was prepared by activating a solid catalyst of silica-magnesium chloride-titanium tetrachloride with diethyl-aluminum chloride. Triethylaluminum was used as a promoter.

After the supply of catalyst was begun, polymerization reaction started smoothly, and an ethylene-1-butene copolymer having a density of 0.9.19 g/cm$^3$ and a melt flow rate of 0.9 g/10 min was obtained. The temperatures in the reactor were not locally varied. After the operation was continued for 20 days, it was shut down. On inspection of the inside of the reactor, a formation of sheet-like substance from molten resin was not observed.

<Comparative Example 1>

In the production of a linear low density ethylene-1-butene copolymer in the like manner as in Example 1 using the same fluidized-bed reactor, the seed polymer was used without previously moistening. In other words, after the reaction system was dried with the same feed gas as that in Example 1, seed polymer particles of the same ethylene-1-butene copolymer as used in Example 1 were introduced into the reactor from the storage silo by a nitrogen flow without the addition of water vapor, and then fluidized by the feed gas to initiate the reaction. The catalyst and promoter were the same as those used in Example 1.

In about 3 hours from the start of the supply of catalyst, the reactor wall thermometer at the height of 30 cm above the gas distributor plate began to indicate a temperature 1° to 2° C. higher than the average temperature of the fluidized-bed. Furthermore, in about 5 hours after the the supply of catalyst was begun, the above temperature difference increased to 10° C., and the reactor wall temperature at the height of 70 cm above the gas distributor plate reached an indication 2° to 3° C. higher than the average temperature. After that, sheet-like molten resins began to appear in the polymerization product, and 12 hours later, the reaction was shut down due to the blocking of the exit port for the polymer.

<EXAMPLE 2>

In producing a linear low density ethylene-1-butene copolymer similarly as in Example 1, seed polymer containing molecular oxygen was used. In other words, dried air was fed with a velocity (based on empty column) of 0.75 cm/sec into the bottom of the storage silo which contained the same seed polymer as used in Example 1. The operation was continued for 24 hours so as to add molecular oxygen. The quantity of fed oxygen in this treatment was 0.13 kg-oxygen/kg-seed polymer.

The above seed polymer was introduced by a nitrogen flow into the reactor which had been dried similarly as in Example 1, and the polymerization reaction for ethylene-1-butene copolymer was initiated using the same feed gas, catalyst and promoter as in Example 1.

After the supply of Catalyst was begun, polymerization reaction started smoothly, and an ethylene-1-butene copolymer having a density of 0.920 g/cm$^3$ and a melt flow rate of 0.9 g/10 min was obtained. The temperatures in the reactor were not locally varied. After the operation was continued for 15 days, it was shut down. On inspection of the inside of the reactor, a formation of sheet-like substance due to molten resins was not observed.

<EXAMPLE 3>

In producing a linear low density ethylene-1-butene copolymer similarly as in Example 1, seed polymers containing moisture and molecular oxygen were used. In other words, air was fed with a velocity (based on empty column) of 0.75 cm/sec into the bottom of the storage silo which contained the same seed polymer as used in Example 1; water was vaporized through a heater with a constant volume pump and introduced into the air flow. The above treating was continued for 24 hours, while the quantity of water introduced reached $3 \times 10^{-3}$ kg-water/kg-seed polymer. As the result, the moisture content of the seed polymer before introduced into the reactor was 40 ppm. The quantity of oxygen fed during the above treating was 0.13 kg-oxygen/kg-seed polymer.

The seed polymers containing moisture and oxygen thus added were introduced by a nitrogen flow into the reactor which had been dried similarly as in Example 1, and the polymerization reaction for ethylene-1-butene copolymer was initiated using the same feed gas, catalyst and promoter as in Example 1.

After the supply of catalyst was begun, polymerization reaction started smoothly, and an ethylene-1-butene copolymer having a density of 0.918 g/cm$^3$ and a melt flow rate of 1.0 g/10 min was obtained. The temperatures in the reactor were not locally varied. After the operation was continued for 20 days, it was shut down. On inspection of the inside of the reactor, a formation of sheet-like substance due to molten resins was not observed.

<EXAMPLE 4>

In producing a linear low density ethylene-1-butene copolymer similarly as in Example 1, seed polymers brought into contact with the atmosphere were used. In other words, the atmosphere was fed with a velocity (based on empty column) of 0.75 cm/sec into the bottom of the storage silo which contained the same seed polymer as used in Example 1, and it was continued for 24 hours.

The seed polymers thus brought into contact with the atmosphere were introduced by a nitrogen flow into the reactor which had been dried similarly as in Example 1, and the polymerization reaction for ethylene-1-butene copolymer was initiated using the same feed gas, catalyst and promoter as in Example 1.

After the supply of catalyst was begun, polymerization reaction started smoothly, and an ethylene-1-butene copolymer having a density of 0.919 g/cm$^3$ and a melt flow rate of 0.8 g/10 min was obtained. The temperatures in the reactor were not locally varied. After the operation was continued for 25 days, it was shut down. On inspection of the inside of the reactor, a formation of sheet-like substance due to molten resins was not observed.

<Example 5>

In producing a linear low density ethylene-1-butene copolymer similarly as in Example 1, seed polymers previously exposed to the atmosphere were used. In other words, the same seed polymers as used in Example 1 were put into paper bags and left still in the atmosphere for 24 hours with the mouths opened. The average temperature of the atmosphere was 20° C. and its relative humidity was about 56%.

The above seed polymers exposed to the atmosphere were put into a storage silo, from which the seed polymers were introduced by a nitrogen flow into the reactor which had been dried similarly as in Example 1, and the polymerization reaction for ethylene-1-butene copolymer was initiated using the same feed gas, catalyst and promoter as in Example 1.

After the beginning of the supply of catalyst, polymerization reaction started smoothly., and an ethylene-1-butene copolymer having a density of 0.920 g/cm$^3$ and a melt flow rate of 2.0 g/10 min was obtained. The temperatures in the reactor were not locally varied. After the operation was continued for 30 days, it was shut down. On inspection of the inside of the reactor, a formation of sheet-like substance due to molten resins was not observed.

<EXAMPLE 6>

In producing a linear low density ethylene-1-butene copolymer similarly as in Example 1, seed polymers were used after they were left spread in the atmosphere. In other words, the same seed polymers as used in Example 1 were spread on a sheet and left still in the atmosphere for 20 hours. The average temperature of the atmosphere was 20° C. and its relative humidity was about 70%.

The above seed polymers exposed to the atmosphere were put into a storage silo, from which the seed polymers were introduced by a nitrogen flow into the reactor which had been dried similarly as in Example 1, and the polymerization reaction for ethylene-1-butene copolymer was initiated using the same feed gas, catalyst and promoter as in Example 1.

After the beginning of the supply of catalyst, polymerization reaction started smoothly, and an ethylene-1-butene copolymer having a density of 0.918 g/cm$^3$ and a melt flow rate of 2.1 g/10 min was obtained. The temperatures in the reactor were not locally varied. After the operation was continued for 25 days, it was shut down. On inspection of the inside of the reactor, a formation of sheet-like substance due to molten resins was not observed.

INDUSTRIAL APPLICABILITY

When polyolefin particles are produced by a vapor-phase fluidized-bed using particles containing moisture and/or molecular oxygen at the start of reaction according to the present invention, the temperatures in a reactor do not locally increase and formation of molten resins are not observed in the reactor after the shutdown. Further, the operation can be carried out much more smoothly than in the case without particles containing moisture and/or oxygen.

We claim:

1. In the homopolymerization reaction of ethylene or copolymerization reaction of ethylene with an α-olefin or α-olefins in the presence of titanium and/or vanadium based compounds as catalysts together with an organic aluminum compound as a co-catalyst, using a vapor-phase fluidized bed, the improvement comprising that said reaction is started by feeding said catalyst together with said co-catalyst after filling a reactor with polyolefin particles that have been brought into contact with a gas containing moisture, said particles being able to form a fluidized-bed, and said particles containing 20 to 80 ppm by weight of moisture.

2. A method according to claim 1, wherein said gas is an inert gas.

3. A method according to claim 1, wherein said gas is air.

4. A method according to claim 1 wherein said particles have an average particle size of from 500 to 2,000 μm.

5. A method according to claim 1 wherein said organic aluminum compound is an alkyl aluminum.

6. A method according to claim 1 wherein the α-olefin contains from 2 to 8 carbon atoms.

7. In a vapor-phase fluidized bed process for the homo- or copolymerization of ethylene with one or more α-olefins within a reaction vessel in the presence of a titanium and/or vanadium-based catalyst and an organic aluminum co-catalyst, the improvement comprising (1) adding polyolefin particles containing from 20 to 80 ppm by weight of moisture to the reaction vessel in which the particles have been brought into contact with a gas containing moisture prior to their addition into the reaction vessel, (2) subsequently adding the catalyst and co-catalyst to the reaction vessel, and (3) in initiating the polymerization reaction.

8. A method according to claim 7 wherein said gas is water vapor.

9. A method according to claim 7 wherein said gas in an inert gas.

10. A method according to claim 7 wherein said gas is air.

* * * * *